(12) United States Patent
Wade et al.

(10) Patent No.: US 9,329,038 B2
(45) Date of Patent: May 3, 2016

(54) ELECTRONIC DEVICES WITH CALIBRATED COMPASSES

(75) Inventors: Jeremy L. Wade, San Francisco, CA (US); Ryan J. Garrone, Wildwood, MO (US)

(73) Assignee: Apple Inc., Cupertino, CA (US)

( * ) Notice: Subject to any disclaimer, the term of this patent is extended or adjusted under 35 U.S.C. 154(b) by 874 days.

(21) Appl. No.: 13/250,785

(22) Filed: Sep. 30, 2011

(65) Prior Publication Data
US 2013/0085698 A1    Apr. 4, 2013

(51) Int. Cl.
*G01C 17/38* (2006.01)
*G06F 19/00* (2011.01)

(52) U.S. Cl.
CPC ................................... *G01C 17/38* (2013.01)

(58) Field of Classification Search
CPC ........ G01C 17/38; G01C 17/02; G01C 17/00; G06F 19/00; G01D 18/00; G01R 35/00; G03B 3/00; G06K 7/10
USPC .......................................................... 702/92
See application file for complete search history.

(56) References Cited

U.S. PATENT DOCUMENTS

| 7,606,676 | B2 | 10/2009 | Sato et al. |
| 7,818,136 | B2 | 10/2010 | Chen et al. |
| 2003/0140510 | A1* | 7/2003 | Woods .................... G01C 17/38 33/357 |
| 2004/0228116 | A1* | 11/2004 | Miller et al. ..................... 362/84 |
| 2006/0005016 | A1* | 1/2006 | Lee et al. ....................... 713/164 |
| 2008/0118240 | A1* | 5/2008 | Hong et al. .................... 396/133 |
| 2009/0146047 | A1* | 6/2009 | Klein ........................... 250/201.7 |
| 2009/0167295 | A1* | 7/2009 | Chen et al. ..................... 324/202 |
| 2010/0307015 | A1* | 12/2010 | Mayor .................... G01C 17/38 33/303 |
| 2010/0312509 | A1* | 12/2010 | Patel ....................... G01C 17/38 702/92 |
| 2010/0312510 | A1* | 12/2010 | Piemonte ................ G01C 17/38 702/93 |
| 2010/0324862 | A1* | 12/2010 | Sato et al. ...................... 702/150 |
| 2011/0084887 | A1* | 4/2011 | Mow et al. ..................... 343/703 |
| 2011/0106474 | A1 | 5/2011 | Kulik et al. |
| 2011/0148320 | A1* | 6/2011 | Wu ............................. 315/294 |
| 2011/0241656 | A1* | 10/2011 | Piemonte ................ G01C 17/38 324/207.11 |
| 2012/0086438 | A1* | 4/2012 | Tu ....................... G01R 33/0035 324/202 |
| 2012/0206129 | A1* | 8/2012 | Mahan et al. .................. 324/202 |

FOREIGN PATENT DOCUMENTS

EP    2395321    12/2011

* cited by examiner

*Primary Examiner* — Gregory J Toatley
*Assistant Examiner* — Ruihua Zhang
(74) *Attorney, Agent, or Firm* — Treyz Law Group, P.C.; Zachary D. Hadd; Kendall P. Woodruff (57) ABSTRACT

Electronic devices may be provided with compasses for detecting the Earth's magnetic field. Electronic devices may be provided with other electronic components. A compass may include a magnetic sensor and control circuitry configured to apply offsets or other compass calibration data to compass data to compensate for magnetic interference from the other electronic components. Other electronic components may include components such as cameras, auto-focus lens mechanisms, light sources, and displays. The control circuitry may be configured to apply compass calibration data that is specific to an electronic component and that is specific to an operational status of the component. The control circuitry may be configured to recognize a replacement electronic component and revert to an average compass calibration correction. The control circuitry may be configured to output interference-corrected compass data to applications running on the electronic device.

16 Claims, 11 Drawing Sheets

ELECTRONIC DEVICES WITH CALIBRATED COMPASSES

BACKGROUND

This relates generally to electronic devices and, more particularly, to electronic devices with compasses.

Electronic devices such as portable computers are often provided with compasses and other electronic components. For example, a Global Positioning System (GPS) device or cellular telephone may have a compass for orienting maps displayed to a user on an associated device display.

Other electronic components in an electronic device with a compass often generate magnetic fields when the other electronic components are turned on and off or during operation of the other electronic components. For example, electrical current is often supplied to an electrical component when the electrical component is operated. The electric current flowing through the electronic component (or flowing through a power supply line that provides the electric current to the electronic component) often generates magnetic fields. These magnetic fields can interfere with the proper operation of the compass.

In the presence of interfering magnetic fields from other components in the electronic device, a compass may provide compass data that is in error by several angular degrees or more. Errors of this type may be exaggerated when a compass is in close proximity to an electronic component that produces an interfering magnetic field. It is therefore difficult to provide accurate compass data, particularly in compact electronic devices in which compasses must be placed in close proximity to other electronic components.

It would therefore be desirable to be able to provide electronic devices with improved compasses.

SUMMARY

Electronic devices may be provided with compasses and other electronic components. A compass may include a magnetic sensor such as a magnetometer for sensing the Earth's magnetic field. Magnetometer data may be gathered and processed by compass interface circuitry or other control or processing circuitry associated with the electronic device. Magnetometers may be implemented using anisotropic magnetoresistance (AMR) sensors.

An electronic device may be configured to simultaneously operate the compass and one or more other electronic components such as cameras, auto-focus lenses, flashlights, camera flashes, displays, proximity sensors, display backlights, central processing units, GPS circuitry, accelerometers, gyroscopes, headphones, speakers, or vibrators. For example, processing circuitry may be used to run software on the electronic device such as search applications that display a camera viewer with location information (obtained using the compass) overlaid on the camera viewer display. In this type of application, a camera, camera light, camera auto-focus mechanism, control circuitry and other components may be operated in combination with the compass. Components such as a camera, an image sensor, camera lights, camera auto-focus mechanisms, processing circuitry and power supply traces associated with these components may generate magnetic fields that interfere with compass sensing of the Earth's magnetic field.

Device circuitry such as control circuitry may be used in obtaining compass data with the compass. The control circuitry may be configured to processing the compass data to reduce errors from the magnetic interference produced by the other components.

Device control circuitry may be configured to apply pre-calibrated compass offsets, scale factors, or other corrections to compass data to compensate for interfering magnetic fields that may be generated by other electronic components such as cameras, camera flashes, etc. that are operated in combination with the compass.

During manufacturing, electronic devices may be calibrated using a calibration system. A calibration system may include calibration software run using processing circuitry on the electronic device, may includes a magnetic-field-controlled test chamber and calibration computing equipment, or may include a combination of software run on the electronic device and external calibration equipment. Magnetometer test data may be collected while other device components are operated. Calibration computing equipment may be used to extract compass calibration data (associated with one or more operating states of one or more electronic components) from magnetometer test data captured during calibration operations.

Compass calibration data associated with each electronic component may be stored using storage on the electronic device. Compass calibration data associated with each component may be stored with identifier information (e.g., a serial number) of the component. Control circuitry in a device may be configured to recognize a replacement component if a device component is damage and replaced. Control circuitry may be provided with general compass calibration data associated with one or more groups of device components. The control circuitry may be configured to apply general compass calibration data to compass data when a new component identifier associated with an uncalibrated component is detected.

Further features of the invention, its nature and various advantages will be more apparent from the accompanying drawings and the following detailed description.

DETAILED DESCRIPTION

Electronic devices may be provided with compasses and other electronic components. The compass may include a magnetic sensor such as a magnetometer and compass interface circuitry. The compass interface circuitry may be configured to convert raw magnetometer data into directional compass data (also called compass data). An electronic device may be provided with control circuitry configured to apply pre-calibrated compass calibration data to the compass data to correct for magnetic interference from other electronic components. The control circuitry may include a portion of the compass interface circuitry, may include substantially all of the compass interface circuitry, or may be separate from the compass interface circuitry.

Other electronic components may include cameras, speakers, auto-focus lens mechanisms, camera flashes, Light Emitting Diodes (LEDs), processing circuitry such as central processing units, memory or other integrated circuits, Global Positioning System (GPS) circuitry, display circuitry, light-emitting display circuitry, display backlights, headphones, batteries, vibrators, actuators or other components.

Other electronic components may have corresponding power lines (e.g., wires, conductive traces on a printed circuit board, etc.) that supply power to the electronic components. Control circuitry may be configured to apply pre-calibrated compass calibration data to compass data to correct for magnetic interference from magnetic fields generated by current flowing in the power supply lines.

Compass calibration data may be obtained using a calibration system that includes a test chamber such as a magnetic-field-controlled test chamber and test equipment such as calibration computing equipment. During testing and calibration, electronic devices are sometimes referred to as devices under test (DUTs). Control circuitry may include storage such as memory for storing compass calibration data that is specific to a calibrated component within the electronic device. If desired, the component-specific compass calibration data (sometimes referred to herein as component-specific calibration data or compass calibration data) may be stored with an associated identifier such as a serial number or part number of the component.

Control circuitry may be configured to store compass calibration data that is generic to a group of components mounted within many electronic devices (i.e., a set of average manufacturer-specific calibration data for all calibrated components associated with a component manufacturer). Control circuitry may be configured to recognize a new component when an electronic component is replaced in the electronic device (e.g., by detecting a new serial number that is different from the serial number of the originally installed component).

In the scenario in which a new component is recognized, the control circuitry may be configured to apply the generic manufacturer-specific compass calibration data when correcting for magnetic interference from the new component.

Figure 1:
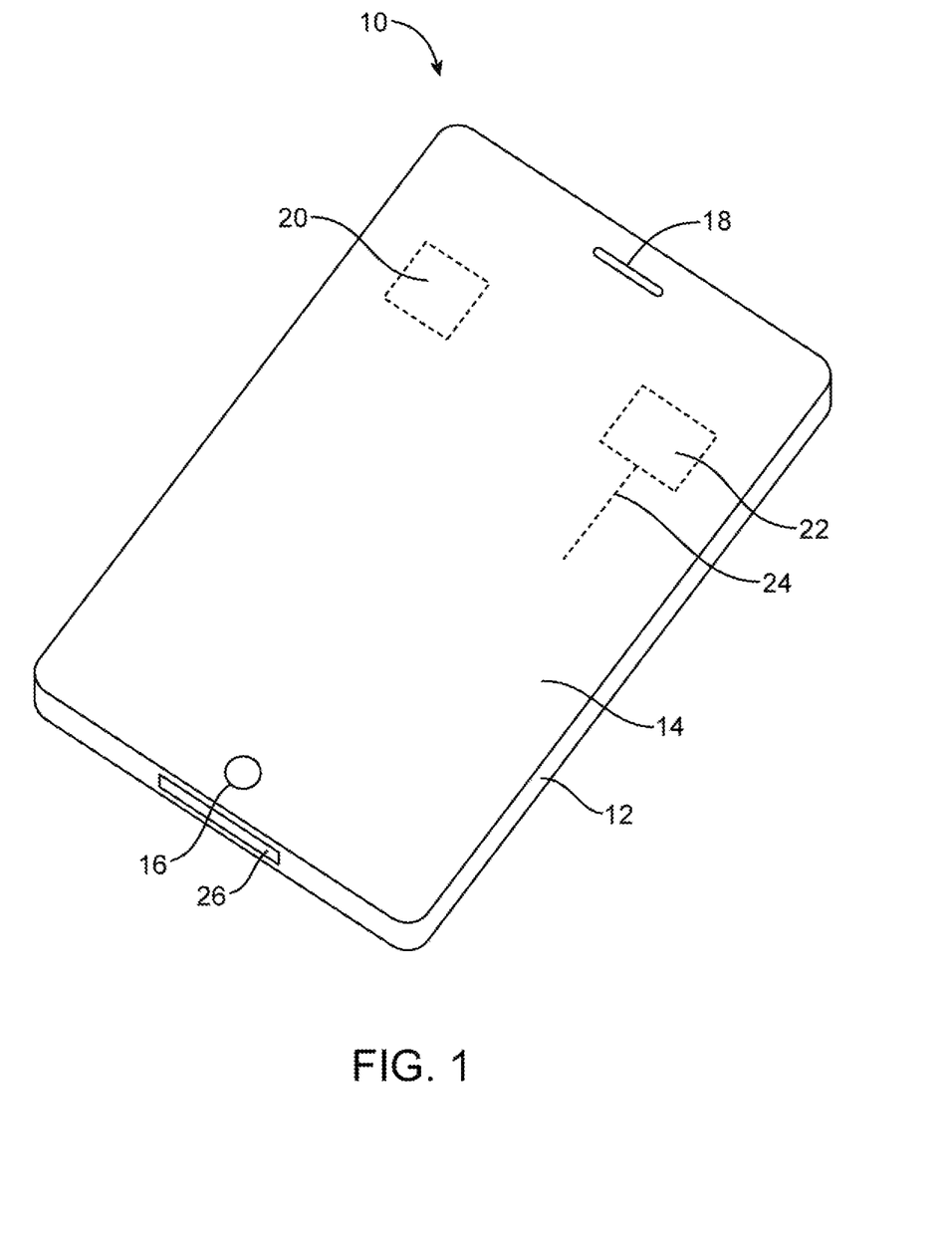
FIG. 1 is a perspective front view of an illustrative electronic device having an interference-calibrated compass in accordance with an embodiment of the present invention.

An illustrative electronic device of the type that may be provided with one or more interference-calibrated compasses is shown in FIG. 1. Electronic device 10 of FIG. 1 may be a cellular telephone, media player, computer, handheld device, portable computer, tablet computer, Global Positioning System device, camera, gaming device, or other electronic equipment.

As shown in FIG. 1, device 10 may have a housing such as housing 12. Housing 12 may be formed from plastic, metal, carbon fiber composite material, other composites, glass, ceramics, other materials, or combinations of these materials. Housing 12 may be formed using a unibody construction in which housing 12 is substantially formed from a single structure (e.g., machined or cast metal, plastic, etc.) or may be formed from multiple pieces of material.

For example, housing 12 may include front and rear planar housing structures. The front planar housing structure may be a display cover layer for a display such as display 14. The display cover layer may be formed from glass and may sometimes be referred to as cover glass or display cover glass. The display cover layer may also be formed from other transparent materials such as plastic.

Device 10 may have input-output devices such as input-output ports, speakers, microphones, displays, status indicator lights, touch screens, buttons, proximity sensors, wireless circuitry, accelerometers, ambient light sensors, touch pads, and other devices for accepting input from a user or the surrounding environment of device 10 and/or for providing output to a user of device 10.

As shown in the illustrative configuration of FIG. 1, device 10 may, as an example, have one or more buttons 16 which may be used to gather user input. Buttons 16 may be based on dome switches or other switch circuitry. Buttons 16 may include button members that form push buttons (e.g., momentary buttons), slider switches, rocker switches, etc. Additional buttons such as buttons 16, additional data ports such as port 26, and additional input-output components such as speaker 18 may be provided in device 10 if desired. The example of FIG. 1 is merely illustrative.

Device 10 may have a flexible or rigid display such as display 14. Display 14 may be formed from multiple layers of material. These layers may include a touch sensor layer such as a layer on which a pattern of indium tin oxide (ITO) electrodes or other suitable transparent electrodes have been deposited to form a capacitive touch sensor array. These layers may also include a layer that contains an array of display pixels. The touch sensor layer and the display layer may be formed using flexible sheets of polymer or other substrates having thicknesses of 10 microns to 0.5 mm or other suitable thicknesses (as an example).

The display pixel array may be, for example, an organic light-emitting diode (OLED) array. Other types of flexible display pixel arrays may also be formed (e.g., electronic ink displays, etc.). This is, however, merely illustrative. Display 14 may be formed using any suitable display technology such as liquid crystal display (LCD) technology or other display technology.

In addition to functional display layers (i.e., the display array and the optional touch sensor array), display 14 may include one or more structural layers. For example, display 14 may be covered with a flexible or rigid cover layer and/or may be mounted on a support structure (e.g., a rigid support In configurations for display 14 in which the flexible layers are covered by a rigid cover glass layer or other rigid cover layer, the rigid layer may be provided with one or more openings and the electronic components may be mounted under the openings. For example, a rigid cover layer may have openings such as a circular openings for button 16 and a speaker port opening such as speaker port opening 18 (e.g., for an ear speaker for a user). Device 10 may also have other openings (e.g., openings in display 14 and/or housing 12 for accommodating volume buttons, ringer buttons, sleep buttons, and other buttons, openings for an audio jack, data port connectors, removable media slots, etc.).

As shown in FIG. 1, device 10 may be provided with one or more internal magnetic sensitive devices such as compass 20. Compass 20 may include a magnetic sensor such as a magnetometer (e.g., an anisotropic magnetoresistance (AMR) sensor or other magnetometer) and compass interface circuitry. Compass interface circuitry may be configured to provide compass data to other circuitry. Compass interface circuitry or other control circuitry in device 10 may be configured to store compass calibration data, may be configured to turn compass 20 on and off, may be configured to access information on the operational status of other electronic components, may be configured to apply corrections to compass data based on operational status information (also called status data, operational status data, etc.) associated with other electronic components, may be configured to combine these functions or to perform any other compass related functions for device 10.

Device 10 may include other internal electronic components such as component 22. Component 22 may have an associated power supply line such as conductive line 24. Conductive line 24 may be configured to supply electric power to component 22 from a power supply unit (sometimes called a power management unit (PMU)). Component 22 may be a camera, a speaker, an auto-focus lens mechanism, a camera flash, a Light Emitting Diode (LEDs), processing circuitry such as central processing units, memory or other integrated circuits, Global Positioning System (GPS) circuitry, display circuitry, a battery, a vibrator, an actuator or other component. Conductive line 24 may be a single wire, a twisted pair of wires, a conductive trace on a printed circuit board, etc.

Figure 2:
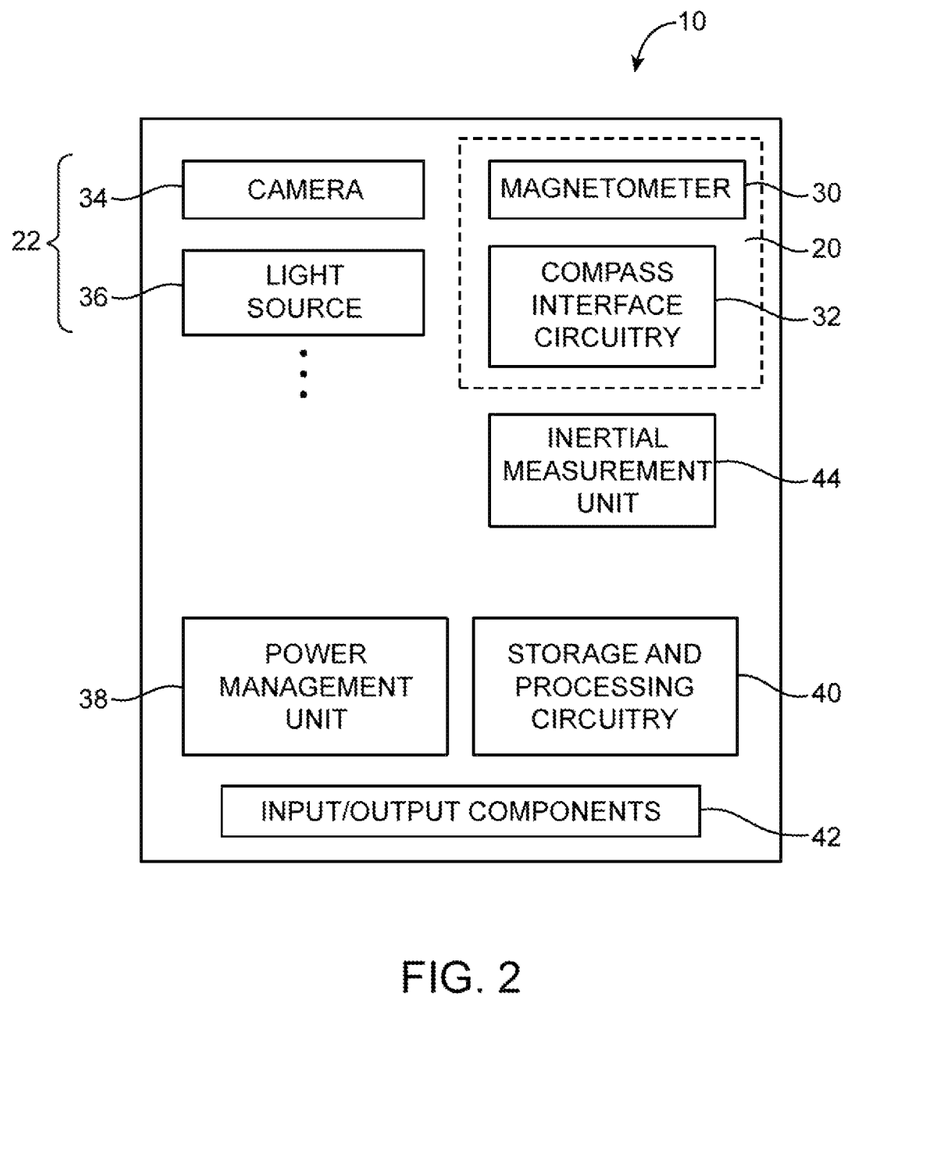
FIG. 2 is a diagram of illustrative circuitry and components for an electronic device having an interference-calibrated compass in accordance with an embodiment of the present invention.

As shown in FIG. 2, compass 20 may include a magnetic sensor such as magnetometer 30 and compass interface circuitry such as compass interface circuitry 32. Compass interface circuitry 32 may be configured to collect raw magnetometer data and provide compass data to other control circuitry such as storage and processing circuitry 40 of device 10. Storage and processing circuitry 40 may be configured to apply an interference correction offset to the compass data to correct for magnetic interference from components such as components 22 and associated conductive lines 24. As shown in FIG. 2, components 22 may include one or more cameras (e.g., a front-facing camera, a rear-facing camera, etc.), one or more light sources (e.g., a camera flash, an LED camera light, a flashlight, etc.) or other components.

Device 10 may include control circuitry such as storage and processing circuitry 40. Storage and processing circuitry 40 may include storage such as hard disk drive storage, non-volatile memory (e.g., flash memory or other electrically-programmable-read-only memory configured to form a solid state drive), volatile memory (e.g., static or dynamic random-access-memory), etc.

Processing circuitry in storage and processing circuitry 40 and other control circuits such as control circuits in compass 20 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 40 may be used to run software on device 10, such as internet browsing applications, map applications, voice-over-internet-protocol (VOIP) telephone call applications, email applications, media playback applications, operating system functions, camera functions, camera based applications, light source functions, display functions, GPS operations, etc.

Some applications may use combined data from compass 20 and a positioning sensor such as inertial mass unit (IMU) 44. Inertial mass unit 44 may include one or more accelerometers, one or more gyroscopes, GPS circuitry, etc. for determining the location and position of device 10. Storage and processing circuitry 40 may be configured to operate IMU 44 in combination with antenna 20 to provide position and location information to applications running on device 10. Compass 20 may be formed separately from IMU 44 or may be formed as an integral part of IMU 44. In one preferred embodiment that is sometimes discussed herein as an example, compass 20 may be formed as a single integrated circuit attached to a main logic board (e.g., a printed circuit board) using a ball grid array.

Storage and processing circuitry 40 may be used to operate power management unit (PMU) 38 to supply electrical power to components 22 such as camera 34 and light source 36. Storage and processing circuitry 40 may be used to operate input/output components such as input/output components 42 and to process and store data input to device 10 using input/output components 42. Input/output components 42 may include buttons or speakers such as button 16 and speaker 18 of FIG. 1. Input/output components 42 may include touch-sensitive portions of display 14, may include a keyboard, wireless circuitry such as wireless local area network transceiver circuitry and cellular telephone network transceiver circuitry, and other components for receiving input and supplying output. Components 22 may be internal to device 10 or may have portions that are visible on a portion of an exterior surface of device 10.

Control circuitry such as storage and processing circuitry 40 may include circuitry for interfacing with the resources of compass 20 (e.g., control circuitry of compass interface circuitry 32 may be considered to form part of storage and processing circuitry 40). For example, control circuitry 40 may be configured to run a compass interface software application that interfaces with magnetometer 30.

Figure 3:
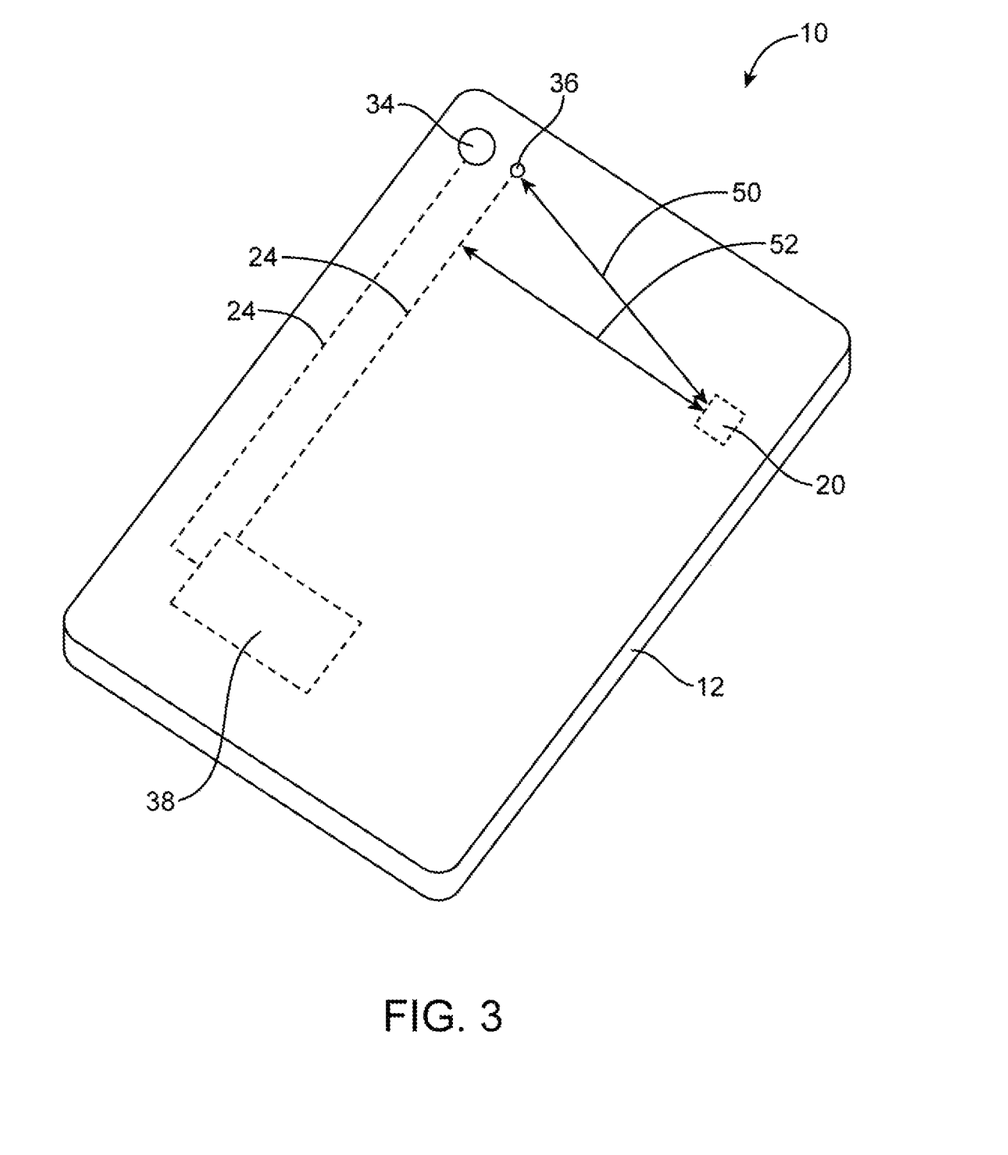
FIG. 3 is a perspective rear view of an illustrative electronic device having an interference-calibrated compass and a camera having a power supply line in accordance with an embodiment of the present invention.

As shown in FIG. 3, camera 34 and light source 36 may be visible on a rear surface of device 10. Camera 34 may be used in combination with light source 36 when capturing images with device 10. Storage and processing circuitry may be configured to continuously display images received by camera 34 on display 14 while displaying integrated location information based on compass data continuously captured by compass 20 on a portion of display 14. Operations of this type in which a component such as camera 34 is operated while compass 20 collects compass data may be improved using compass interface circuitry to correct collected compass data for magnetic interference from camera 34.

Components such as camera 34 and light source 36 may have associated power supply lines such as conductive lines 24 for delivering power from PMU 38. In the example of FIG. 3, light source 36 has a distance 50 from compass 20 while power supply line 24 associated with light source 36 has a minimum distance 52 from compass 20. Magnetic interference from components such as light source 36 and associated power supply lines depends on distances such as distances 50 and 52 respectively, from compass 20. A smaller distance 50 between compass 20 and light source 36 produces larger magnetic interference with compass 20 when light source 36 is operated. A smaller distance 50 between compass 20 and light source 36 produces larger magnetic interference with compass 20 when light source 36 is operated.

Figure 4:
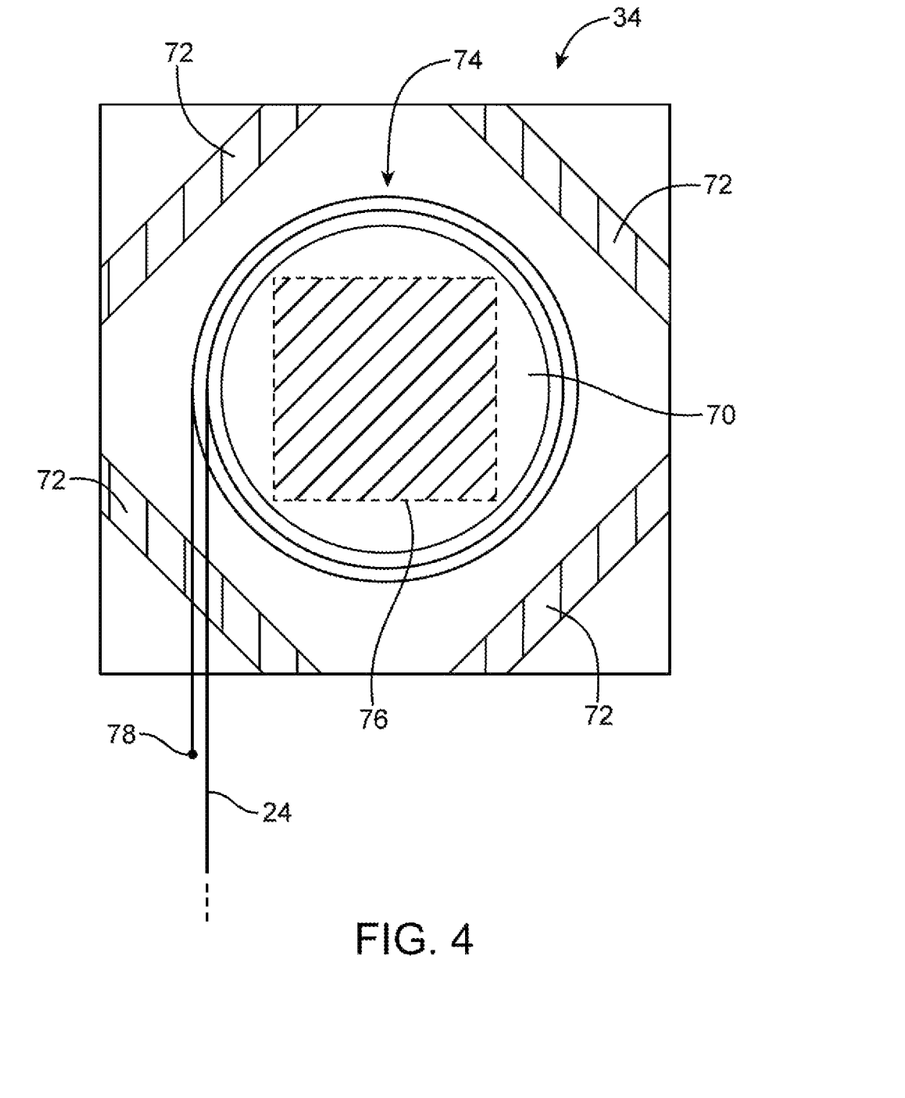
FIG. 4 is a cross-sectional top view of an illustrative camera having an auto-focus mechanism that generates interfering magnetic fields in accordance with an embodiment of the present invention.

Magnetic interference may also depend on individual component configuration and operation. Components such as camera 34 may include magnets, wire coils or other elements that generate interfering magnetic fields during component operation. As shown in FIG. 4, camera 34 may include an array of imaging pixels such image pixel array 76 for capturing image light. Camera 34 may include a lens such as lens 70 that focuses image light onto image pixel array 76.

Camera 34 may include an electronic focusing system for moving lens 70 into an optimal focus position. The focusing system of camera 34 may be an auto-focusing system in which storage and processing circuitry 40 (see FIG. 2) uses image data captured by camera 34 to determine a best focus position for lens 70. The focusing system of camera 34 may include one or more magnets such as fixed magnets 72 and a coil of conductive wire such as coil 74.

Coil 74 may include any number of turns (e.g., one turn, two turns, more than two turns, more than 5 turns, more than 10 turns, 10 to 500 turns, more than 20 turns, more than 40 turns, 50-60 turns, more than 50 turns, less than 60 turns, less than 100 turns or less than 500 turns) of wire wrapped around lens 70. Wire coil 74 may be coupled to a power supply line such as power supply line 24.

Electric current may be supplied along power supply line 24 from a power management unit (e.g., PMU 38 of FIG. 1). Electric current may flow from power supply line 24, through turns of wire associated with coil 74 to a ground contact such as ground terminal 78. Ground terminal 78 may electrically couple coil 74 to a ground plane (i.e., a sheet of conducting material) in a layer of a printed circuit board or otherwise positioned under camera 34. During normal operation of camera 34, lens 70 may be moved to improve the focus of image light on image sensor array 76. Changing magnetic fields generated by changing current flowing through coil 74 may interact with fixed magnets 72 and cause lens 70 to move.

Figure 5:
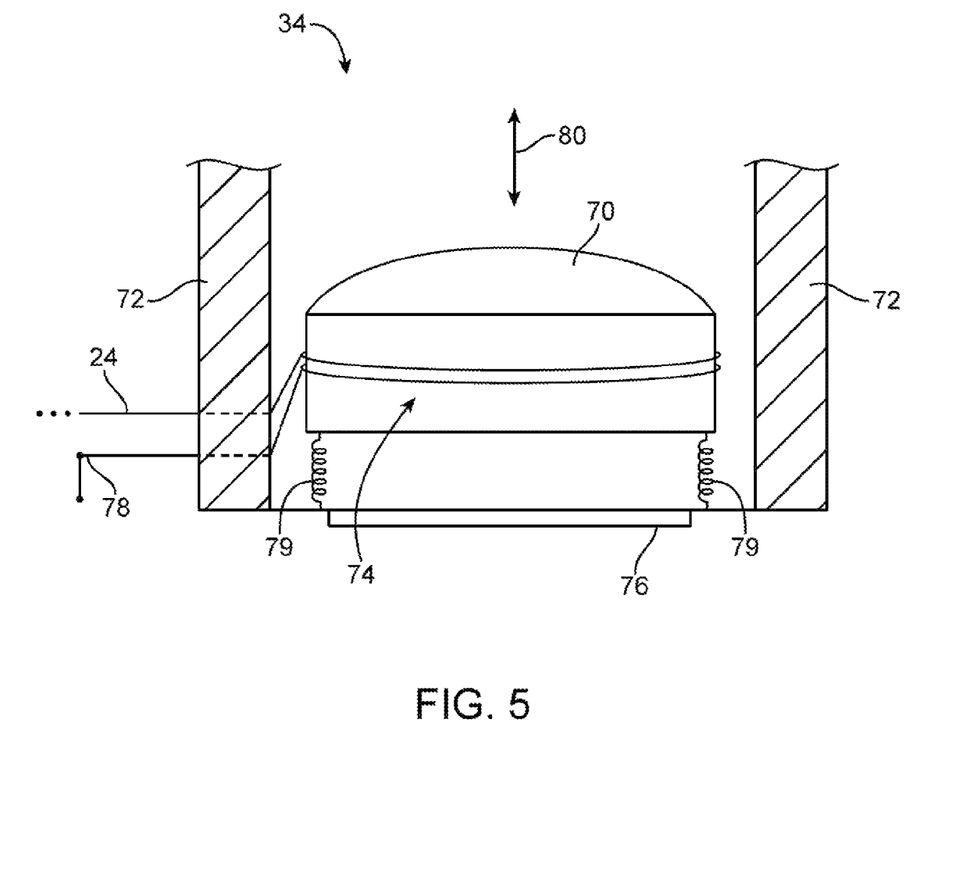
FIG. 5 is a cross-sectional side view of an illustrative camera having an auto-focus mechanism that generates interfering magnetic fields in accordance with an embodiment of the present invention.

Lens 70 may be coupled to one or more elastomeric attachment members such as springs 79, as shown in FIG. 5. Springs 79 may be configured to provide a natural position (sometimes referred to as a default position) for lens 70 with respect to image pixel array 76 within camera 34. Springs 79 may be configured so that the default position of lens 70 with respect to image pixel array 76 is an infinity focus position (i.e., a position in which the lens is a distance from the image pixel array that is equal to the focal length of camera 34).

Forces on lens 70 generated by interactions between the magnetic field generated by the current flow in coil 74 and fixed magnets 72 may cause lens 70 to move closer to, or further from, image pixel array 76 as indicated by arrows 80. Moving lens 70 closer to, or further from, image pixel array 76 by changing the current flowing through coil 74 may change the distance from camera 34 at which objects appear in focus at image pixel array 76. Springs 79 may be configured to provide resistance to motion of lens 70.

A constant current through coil 74 may therefore be needed to hold lens 70 in a position that is different from the default position determined by springs 79. Changing the current through coil 74 move lens 70 to a new position relative to image pixel array 76. A relatively larger current through coil 74 may move lens 70 a relatively larger distance from image pixel array 76 than its default position. A relatively larger current may also produce a relatively larger magnetic field that may interfere with the operation of compass 20. Compass calibration data that is used by control circuitry such as storage and processing circuitry 40 (see FIG. 2) to correct for interference from camera 34 may therefore be dependent on the distance of lens 70 from its default position in camera 34.

In order to provide control circuitry 40 with compass calibration data for correcting compass data errors associated with components such as camera 34, the error induced by magnetic fields generated by components such as camera 34 on compass 20 may be calibrated during manufacturing of device 10.

Figure 6:
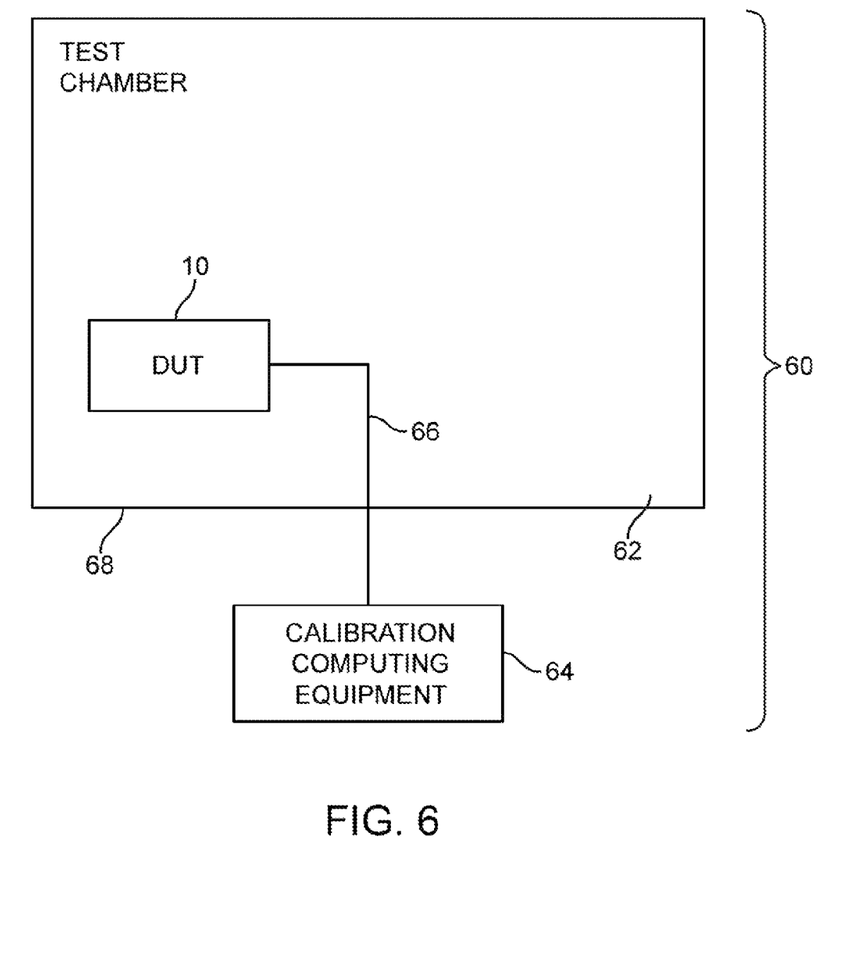
FIG. 6 is a diagram of an illustrative calibration system for extracting compass calibration data from magnetometer test data in accordance with an embodiment of the present invention.

Device 10 may be calibrated using a calibration system of the type shown in FIG. 4. As shown in FIG. 4, compass calibration operations may be performed using a calibration system such as calibration system 60 that includes a test chamber such as test chamber 62 and test equipment such as calibration computing equipment 64. During these operations, electronic devices such as device 10 may be referred to as devices under test (DUT) 10.

Test chamber 62 may include an enclosure such as enclosure 68. Enclosure 68 may magnetically isolate DUT 10 by providing magnetic shielding of DUT 10 during compass calibration operations. Enclosure 68 may be formed from a magnetically permeable material (e.g., mu-metal) that shields DUT 10 from external magnetic fields during calibration operations. If desired, enclosure 68 may simply form an isolating enclosure that magnetically isolates DUT 10 by ensuring a sufficiently large physical distance between DUT 10 and external magnetically interfering equipment such as test equipment 64, other DUTs 10, or other interfering equipment.

Test equipment 64 of calibration system 60 may include one or more test communications paths such as cable 66, one or more computers, dedicated test units that perform test functions, and other suitable computing equipment. During calibration operations calibration computing equipment 64 may, if desired, be coupled to DUT 10 using cable 66.

Calibration computing equipment 64 may be used to operate components such as camera 34, light source 36 (see FIG. 2) or other electronic components 22 while collecting magnetometer data from magnetometer 30. This is merely illustrative. If desired, a test operator may load calibration software onto DUT 10 that operates components such as camera 34, light source 36 (see FIG. 2) or other electronic components 22 while collecting magnetometer data from magnetometer 30.

During calibration operations, components 22 may be turned on and off. During calibration operations, operating states of one or more components 22 may be changed. For example, calibration computing equipment 64 may collect magnetometer data from magnetometer 30 with light source 36 off. Light source 36 may be turned on and calibration computing equipment 64 may collect additional magnetometer data from magnetometer 30. A power supply level to light source 36 may be adjusted to one, two, three or more power levels, thereby changing the intensity of light generated by light source 36.

Calibration computing equipment 64 may collect magnetometer data from magnetometer 30 at each power supply level for light source 36. Magnetometer data collected at all power supply levels may be combined using calibration computing equipment 64 to extract a table of compass calibration data including offsets corresponding to each power supply level of light source 36. For example, light source 36 may produce a small change in magnetometer data from magnetometer 32 when light source 36 is operated at a low power level. This small change may be stored as one or more offsets specific to the lower power level of light source 36 in the table of compass calibration data and used to correct compass data collected by compass 20 during normal operation of device 10.

Light source 36 may produce a relatively larger change in magnetometer data when light source 36 is operated at a relatively larger power level. This relatively larger change in magnetometer data may be stored in the table of compass calibration data as one or more offsets specific to the relatively larger power level status of light source 35. Stored offsets may be used to correct compass data collected by compass 20 during normal operation of device 10.

Compass calibration data associated with, for example, light source 36 may be transmitted to (e.g., loaded into) DUT 10 using calibration computing equipment 64 and stored on compass interface circuitry 32 or storage and processing circuitry 40 along with component identifier information that identifies light source 36 (e.g., a serial number for light source 36). Compass calibration data associated with light source 36 may be also be averaged with compass calibration data associated with compasses in additional electronic devices 10 to form an average compass calibration correction for general light sources installed in devices such as device 10. Average compass calibration correction data for general light sources installed in devices such as device 10 may also be transmitted to DUT 10 using calibration computing equipment 64 and stored on compass interface circuitry 32 or storage and processing circuitry 40 of device 10.

Figure 7:
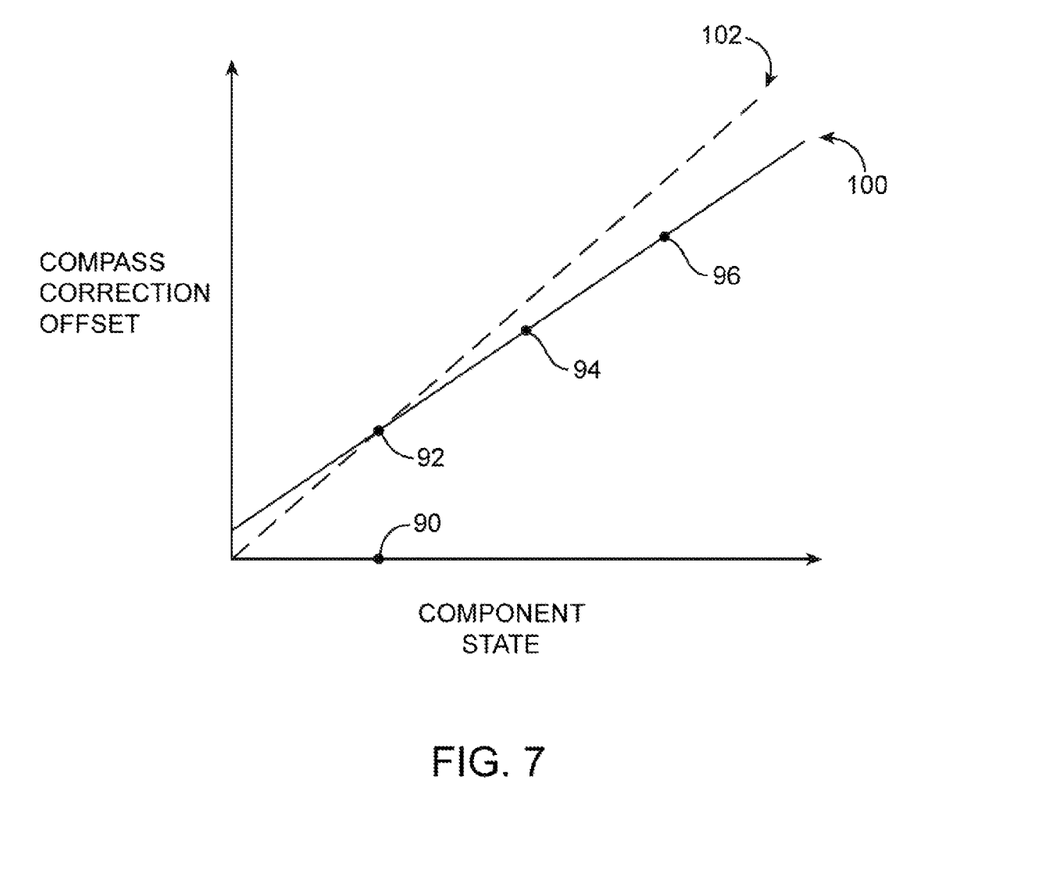
FIG. 7 is a graph showing how an illustrative compass correction may depend on the state of another electronic component in accordance with an embodiment of the present invention.

FIG. 7 is a graph showing how a correction to compass data (e.g., compass calibration data) may depend on an operating state of a component such as camera 34 or light source 36. As shown in FIG. 7, a compass correction offset to compass data that compensates for interference from an electronic component may depend on the component state as indicated by calibration curve 100. Calibration curve 100 may describe the necessary offset (e.g., in degrees) for any given state of a given component.

Compass calibration data may include a 1×3 matrix of compass offsets (sometimes referred to as compass corrections or simply as offsets or corrections) for each component for each state. Compass calibration data may therefore include a 1×3×N table of offsets for each of N states of a given component. Compass calibration data may include a 1×3×N table of offsets for each component. N may be an integer number ranging from one up to any number of states of a given component.

In the example described in connection with FIG. 6, light source 36 may have one, two, three, three to six, six, seven to eleven, eleven or more than eleven operating states (e.g., off, power level 1, power level 2, power level 3, etc.). Compass calibration data may include a 1×3 matrix (e.g., corrections in three dimensions) for each state of light source 36.

Lens 70 of camera 34 may have any number of focus positions with respect to image pixel array 76. Compass calibration data may include a 1×3 matrix of compass corrections (corresponding to a correction in degrees in each of three dimensions) for each focus position of lens 70.

During calibration operations, calibration curve 100 may be determined by collecting magnetometer data from magnetometer 30 in each of four operational component states. As shown in FIG. 7, magnetometer data collected during calibration operations may include magnetometer data 90 collected while the component (e.g., light source 36, camera 34, etc.) is off. Magnetometer data such as magnetometer data 92, 94, and 96 may be collected with the component on and in each of three operational states.

As an example, data 90 may be magnetometer data collected while camera 34 is off. Data 92 may be magnetometer data collected while camera 34 is on and lens 70 is in its default (e.g., infinity focus) position with respect to image pixel array 76. Data 94 may be magnetometer data collected while camera 34 is on and lens 70 is in an intermediate focus position with respect to image pixel array 76. Data 96 may be magnetometer data collected while camera 34 is on and lens 70 is in an extreme focus position (e.g., a near-field focus position for focusing on nearby objects) with respect to image pixel array 76. This is merely illustrative. Calibration system 60 may be used to calibrate compass corrections for any magnetic field generating component of device 10.

Calibration curve 100 may be determined using calibration computing equipment 64 from data 92, 94, and 96. Calibration curve 100 may be determined using any suitable curve fitting or line fitting (e.g., linear regression, least absolute deviation, etc.) algorithm.

Calibration curve 100 may change with the operating temperature of a component (e.g., camera 34, light source 34, or other component 22). For example, calibration curve 100 may change to calibration curve 102 when the temperature of a component 22 is raised or lowered. Compass calibration data may include a 1×3×N table of compass calibration data for any number of possible operating temperatures. Control circuitry 40 may be configured to access component temperature data when acquiring the status of components and determining which 1×3×N table of compass calibration data to use in correcting compass data.

Figure 8:
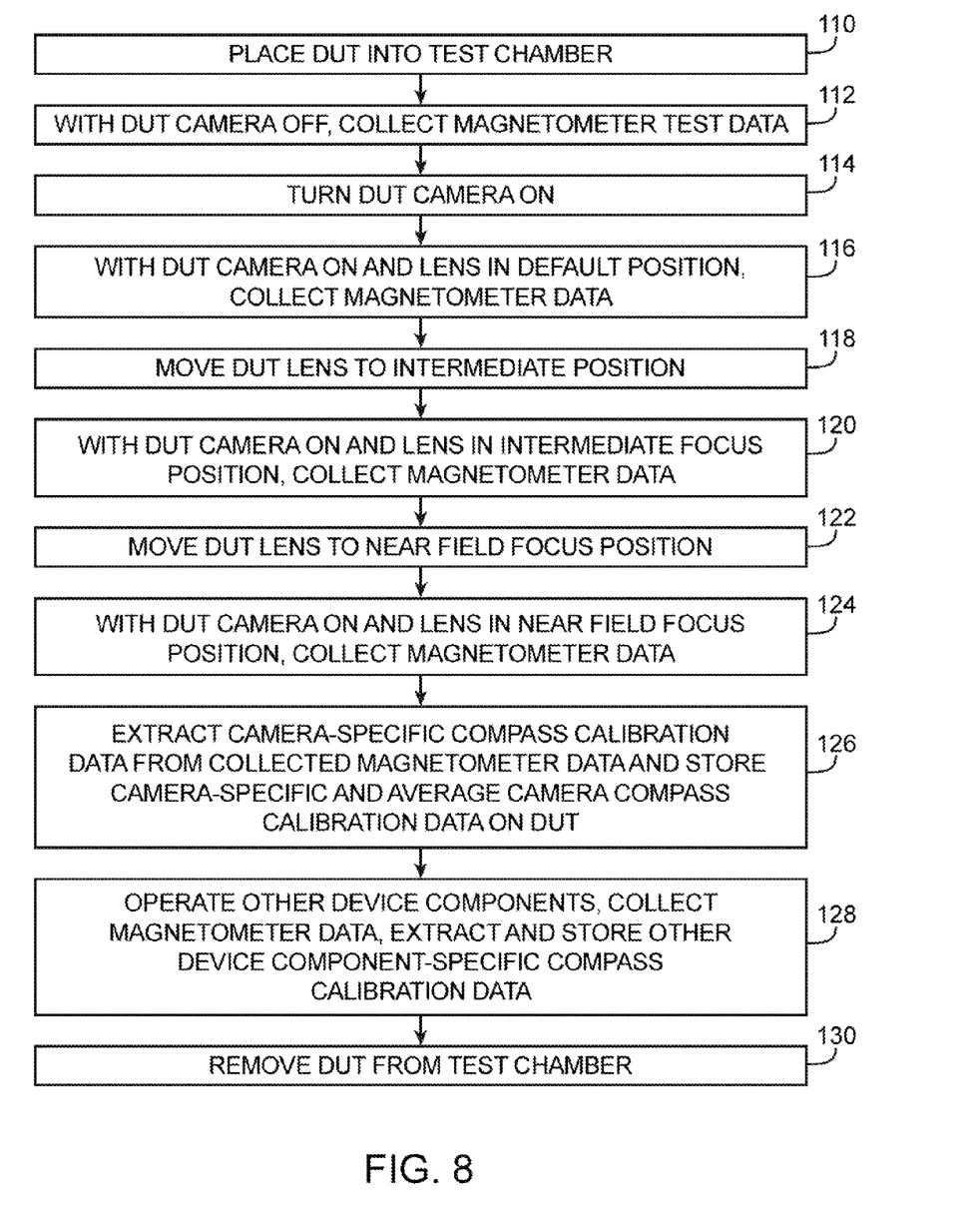
FIG. 8 is a flow chart of illustrative steps involved in calibrating compass interference corrections for magnetic interference from other device components such as a camera auto-focus mechanism in accordance with an embodiment of the present invention.

FIG. 8 is a flow chart of illustrative steps involved in using calibration system 60 of FIG. 7 during calibration of DUT 10.

At step 110, DUT 10 may be placed into test chamber 62. If desired, DUT 10 may be connected to calibration computing equipment 64 using communications path 66.

At step 112, camera 34 may be turned off and test data (e.g., magnetometer test data from magnetometer 30) may be collected.

At step 114, camera 34 of DUT 10 may be turned on.

At step 116, with camera 34 of DUT 10 on and lens 70 in infinity focus position, test data may be collected using calibration computing equipment 64.

At step 118, DUT 10 may be instructed (e.g., by calibration computing equipment 64 or by pre-loaded internal calibration software) to move lens 70 into an intermediate focus position.

At step 120, with camera 34 on and lens 70 in an intermediate focus position, calibration computing equipment 64 may collect magnetometer data from magnetometer 30.

At step 122, lens 70 may be moved into an extreme near field focus position.

At step 124, with camera 34 on and lens 70 in a near field focus position, calibration computing equipment 64 may collect magnetometer data from magnetometer 30.

At step 126, calibration computing equipment 64 may extract operational-status-specific camera-specific compass calibration data (e.g., calibration data associated with an installed camera of DUT 10) and transmit the operational-status-specific camera-specific compass calibration data along with a camera-specific identifier (e.g., a serial number)

of the camera to be stored using compass interface circuitry 32 or storage and processing circuitry 40 of DUT 10.

The example of FIG. 8, in which a component has multiple states (e.g., lens focus positions of camera 34), is merely illustrative. In some configurations, a component may only have one operational state. In configurations in which a component has only one operational state, calibration computing equipment 64 may extract component-specific compass calibration data and transmit the component-specific compass calibration data along with a component-specific identifier (e.g., a serial number) of the camera to be stored using compass interface circuitry 32 or storage and processing circuitry 40 of DUT 10.

If desired, calibration computing equipment 63 may also transmit average compass calibration data determined by averaging a group of camera-specific calibration data to DUT 10. Average compass calibration data may, for example, be an average of all calibration data for all devices having cameras manufactured by one vendor (manufacturer). If desired, calibration computing equipment may transmit multiple sets of average compass calibration data associated with devices having cameras manufactured by multiple corresponding vendors.

At step 128, calibration computing equipment 64 may operate other components 22 (e.g., light source 36 or other electronic components) and collect magnetometer test data. Magnetometer test data collected while operating other components may be used to extract other component-specific (or status-specific component-specific) compass calibration data (e.g., light source-specific compass calibration data, etc.) to be transmitted by calibration computing equipment 64 to DUT 10. Other component-specific compass calibration data and component-specific identifier data may be stored using compass interface circuitry 32 or storage and processing circuitry 40 of DUT 10.

If desired, calibration computing equipment 63 may also transmit average compass calibration data (determined by averaging a group of other component-specific calibration data) to DUT 10. Average compass calibration data may, for example, be an average of all calibration data for all devices having other components manufactured by one vendor. If desired, calibration computing equipment may transmit multiple sets of average compass calibration data associated with devices having other components manufactured by multiple corresponding vendors.

At step 130, DUT 10 may be removed from test chamber 62 and delivered to a consumer.

Figure 9:
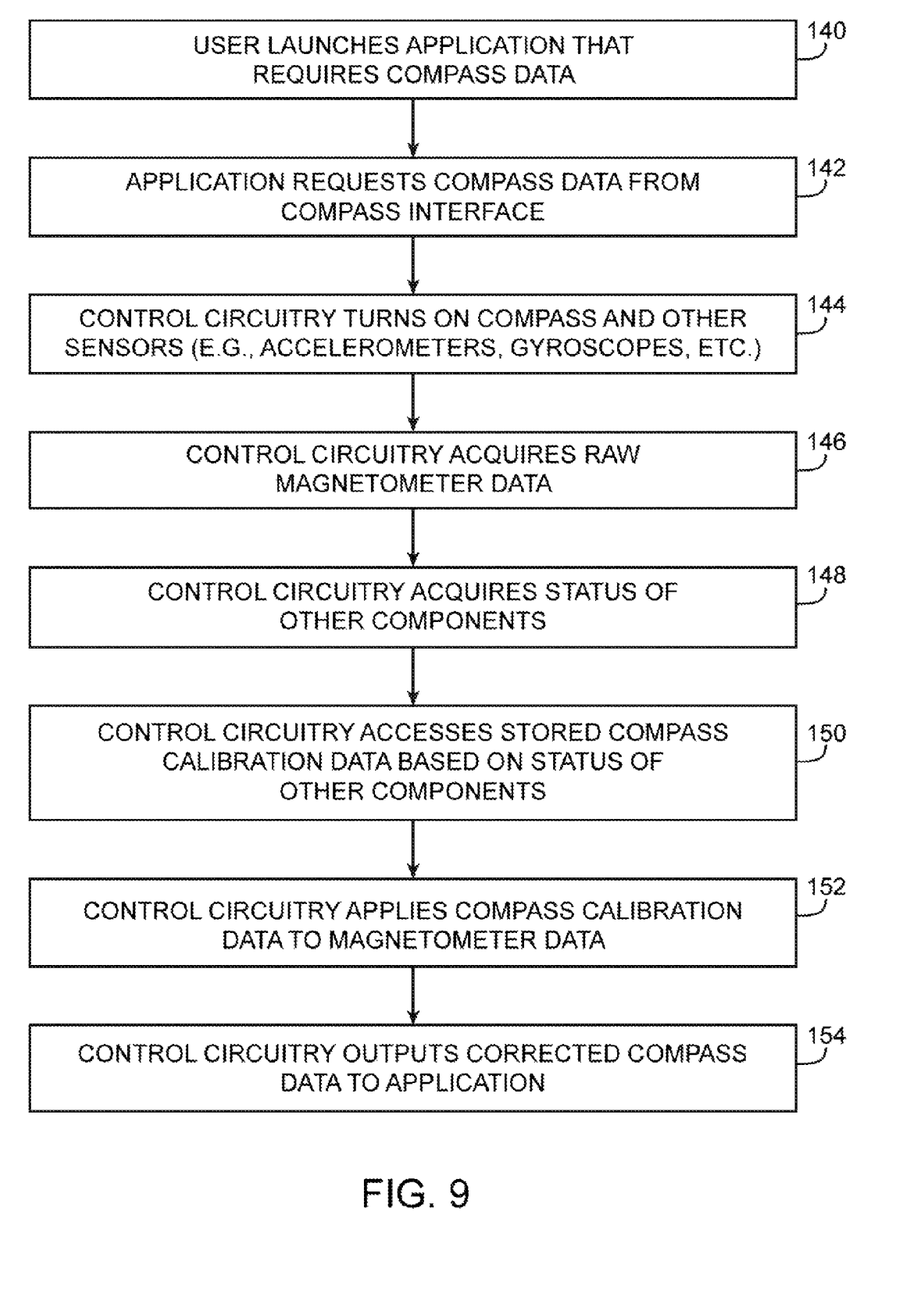
FIG. 9 is a flow chart of illustrative steps involved in using compass calibration data to correct for magnetic interference from other electronic components in an electronic device in accordance with an embodiment of the present invention.

FIG. 9 is a flow chart of illustrative steps involved in using compass interface circuitry 32 and control circuitry 40 to provide corrected compass data to an application running on storage and processing circuitry 40 of device 10.

At step 140, a user of device 10 may use input/output components 42 to launch a software application that requires compass data.

At step 142, the application may request compass data from compass 20.

At step 144, compass interface circuitry 32 or control circuitry 40 may turn on compass 20 (e.g., magnetometer 30) and, if desired, other sensors such as IMU 44.

At step 146, compass interface circuitry 32 may acquire raw magnetometer data from magnetometer 30.

At step 148, control circuitry 40 may acquire the status of other components (e.g., whether camera 34 or light source 36 is on, the position of lens 70 of camera 34, etc.).

At step 150, control circuitry 40 may access stored compass calibration data specific to other device components 22 that were determined to be on at step 148.

At step 152, control circuitry 40 may apply the accessed compass calibration data to the raw magnetometer data to obtain interference-corrected compass data. Applying the accessed compass calibration data to the raw magnetometer data may include applying a 1×3 matrix of pre-calibrated offsets to the raw magnetometer data to compensate for interference by a magnetic field generated by the other components. If desired, compass interface circuitry 32 may process the raw magnetometer data to obtain compass data (e.g., in degrees) prior to applying the accessed compass calibration data to the compass data.

At step 154, control circuitry 40 may output the interference-corrected compass calibration data to the requesting application.

Figure 10:
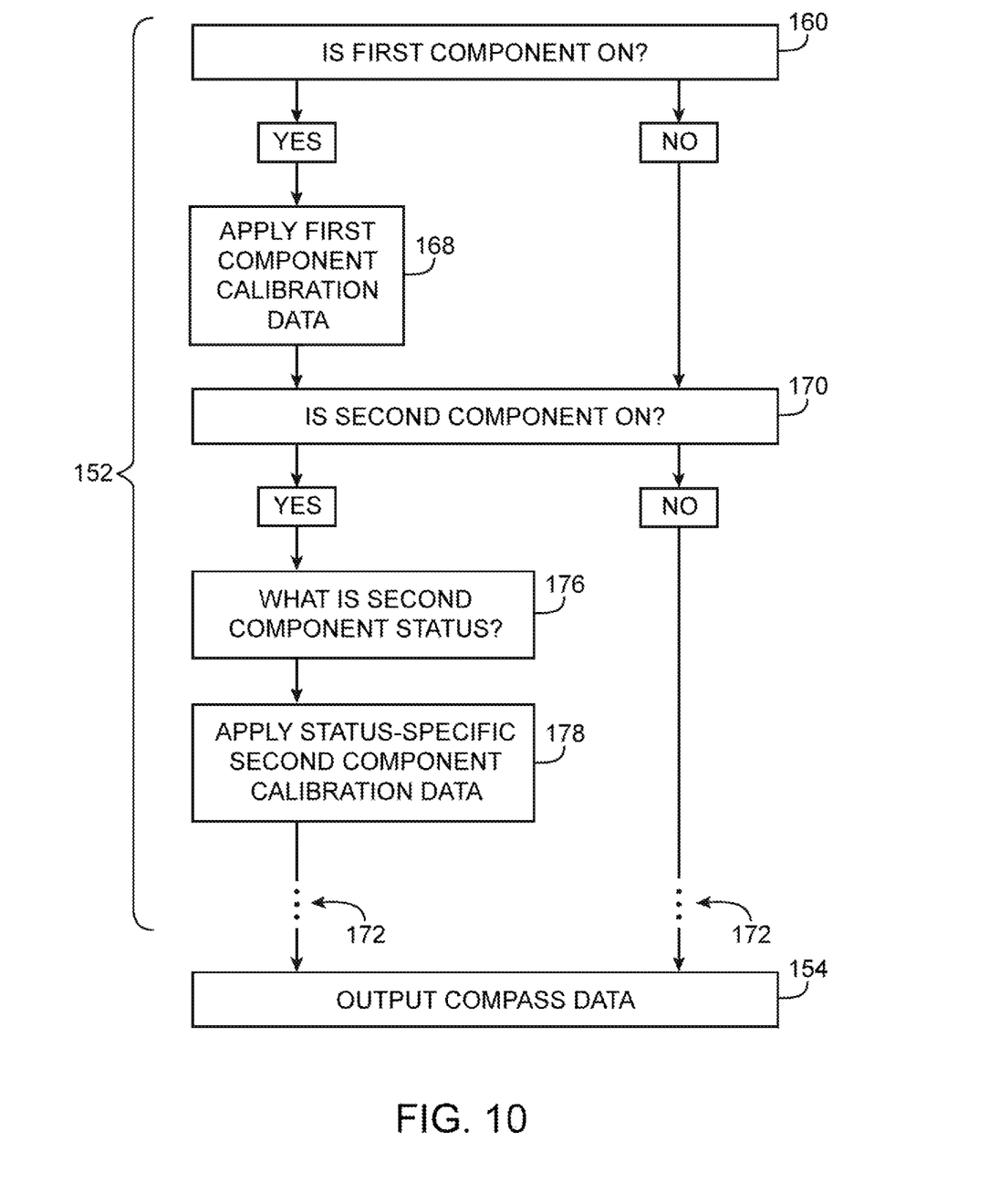
FIG. 10 is a diagram of showing illustrative steps that may be used by control circuitry to combine magnetometer data, component status data, and compass calibration data to obtain interference-corrected compass data in accordance with an embodiment of the present invention.

FIG. 10 is a flow chart of illustrative steps involved in applying compass calibration data to magnetometer data as described in connection with step 152 of the flow chart of FIG. 9.

At step 160, control circuitry 40 may use the acquired status of a first electronic component of device 10 (acquired, e.g., at step 148 of FIG. 9) to determine whether a first component 22 (e.g., light source 34) is on. If control circuitry 40 determines that the first component is not on, control circuitry 40 may move on to step 170. If it is determined that the first component is on, control circuitry 40 may apply the stored compass calibration data specific to the first component to the acquired magnetometer data.

Applying the stored compass calibration data specific to the first component to the acquired magnetometer data may include adding an offset in degrees to the magnetometer data. In the scenario in which the first component is on and the stored compass calibration data specific to the first component has been applied to the acquired magnetometer data, control circuitry 40 may move on to step 170. In some situations, control circuitry 40 may apply a generic compass calibration data (e.g., average, or manufacturer-specific determined by identifying which manufacturer produced the electronic component) to the magnetometer data.

At step 170, control circuitry 40 may use the acquired status of a second electronic component of device (acquired, e.g., at step 148 of FIG. 9) to determine whether a second component 22 (e.g., camera 34) is on. If control circuitry 40 determines that the second component is not on, control circuitry 40 may move on to step 154. If desired, as indicated by dotted portions 172, steps such as steps 160 and 170 may be repeated for additional electronic components 22.

If it is determined that the second component is on, at step 176, control circuitry 40 may use the acquired status of a second electronic component of device 10 to determine an appropriate operational-status-specific compass calibration data (e.g., status-specific compass calibration data that is specific to an operational state such as the position of lens 70 in camera 34 or the power supply level to light source 36) for correcting the magnetometer data.

At step 178, control circuitry 40 may apply the stored status-specific, component-specific compass calibration data to the acquired magnetometer data. In some situations, control circuitry 40 may apply status-specific, component-generic (e.g., average status-specific data for a group of components) compass calibration data to the magnetometer data. If desired, as indicated by dotted portions 172, steps such as steps 160, 170, 176 and 178 may be repeated for additional electronic components 22.

Following application of compass calibration data associated with all components 22 determined to be on by control circuitry 40, at step 154, control circuitry 40 may output the interference-corrected compass calibration data to the requesting application.

During normal operation of device 10, electronic components can become worn out or damaged. Electronic components such as components 22 may be replaced at a retail vendor. Replaced components such as components 22 for which no calibration of the type described in connection with FIG. 8 has been performed can be problematic when performing compass interference corrections using compass calibration data specific to the replaced component.

In order to avoid applying a magnetic interference correction using compass calibration data specific to a component that has been removed, compass calibration data may be stored together with a component identifier such as a serial number. Control circuitry 40 may be configured to compare the serial number of a component with the stored component identifier prior to applying compass calibration data specific to that component. If control circuitry 40 obtains a component identifier that is different from the stored component identifier associated with the component-specific compass calibration data, control circuitry 40 may instead apply the stored average compass calibration data to the magnetometer data.

Figure 11:
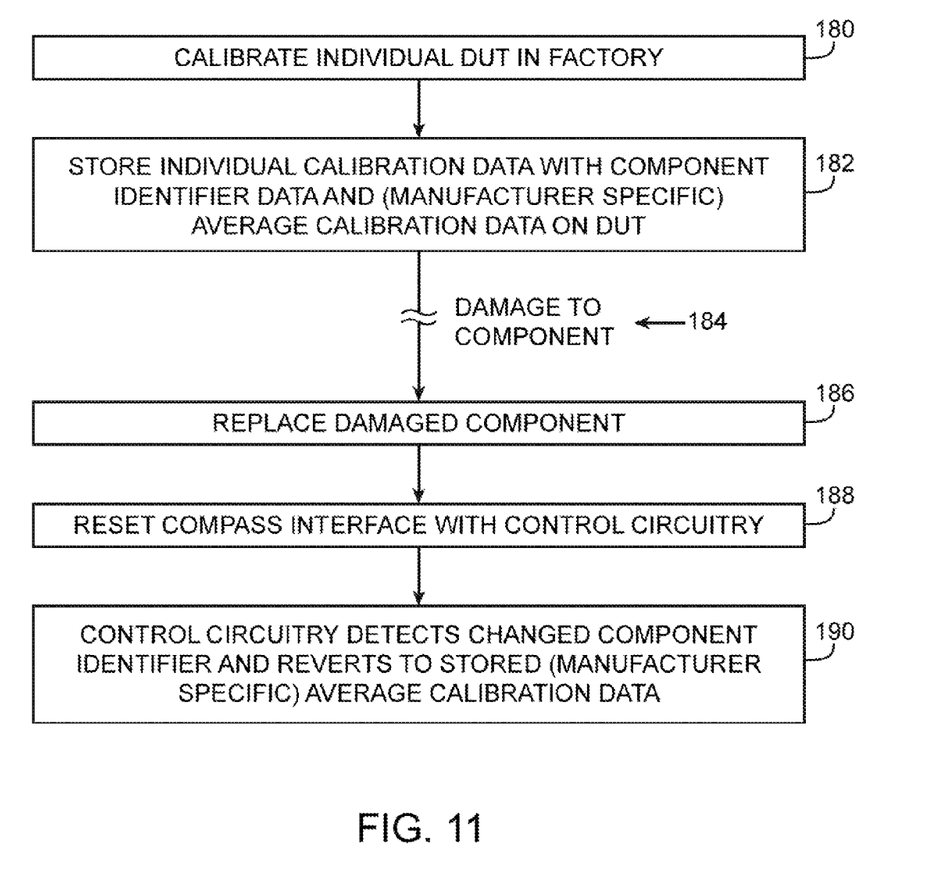
FIG. 11 is a flow chart of illustrative steps involved in reverting to manufacturer-specific compass calibration data for correcting for magnetic interference from a replaced electronic component in an electronic device in accordance with an embodiment of the present invention.

FIG. 11 is a flow chart of illustrative steps involved in reverting to a manufacturer-specific compass calibration data correction in the scenario in which a device component has been replaced.

At step 180, each device 10 may be individually calibrated during manufacturing of device 10 at a factory. Calibrating each device 10 may include obtaining component-specific compass calibration data (e.g., compass calibration data to be used in correcting magnetic interference due to a specific component in device 10) along with a component-specific identifier information. For example, compass calibration data specific to a camera such as camera 34 may be obtained by operating camera 34 (e.g., turning camera 34 on and moving lens 70) while collecting magnetometer data.

At step 182, the component-specific compass calibration data (e.g., specific to camera 34) may be stored on device 10 along with the component-specific identifier (e.g., the serial number of camera 34). Manufacturer-specific compass calibration data specific to calibrated components manufactured by one or more common manufacturers may be stored on device 10.

At step 184, during the operational lifetime of device 10, the component may become damaged or worn out.

At step 186, the damaged or worn out component may be replaced.

At step 188, the compass interface between control circuitry 40 and compass interface circuitry 32 (e.g., a compass interface application running on control circuitry 40) may be restarted (rebooted).

At step 190, control circuitry 40 may recognize that the identifier information of the new component does not match the stored component-specific identifier information (e.g., the serial number of the new camera does not match the stored serial number of the damaged camera). Control circuitry 40 may revert to stored manufacturer-specific compass calibration data for an average component (e.g., averaged compass calibration data for all cameras installed in devices 10 or averaged compass calibration data for a group of cameras installed in devices 10 manufactured by a common manufacturer).

For example, average manufacturer-specific compass calibration data may be specific to a chosen manufacturer of cameras for devices 10. Components 22 such as camera 34 may have a shared manufacturer with components 22 in other electronic devices with compasses. Compass calibration data may include manufacturer-specific compass calibration data that is specific to the shared manufacturer and manufacturer-specific compass calibration data that is specific to another manufacturer of components 22. If desired, average compass calibration data for multiple manufactures of, for example, cameras for device 10 may be stored on device 10. Control circuitry 40 may be configured to recognize a component manufacturer of a replaced component 22 and apply manufacturer-specific compass calibration data specific to that manufacturer to the magnetometer data.

The foregoing is merely illustrative of the principles of this invention and various modifications can be made by those skilled in the art without departing from the scope and spirit of the invention.

What is claimed is:

1. A method for operating an electronic device having control circuitry, an electronic component comprising a camera having a lens and an image pixel array that is operated using the control circuitry, and a compass that is operated using the control circuitry, the method comprising:
    operating the electronic component, wherein operating the electronic component produces magnetic interference for the compass;
    obtaining compass data with the compass;
    with the control circuitry, obtaining a position of the lens with respect to the image pixel array; and
    with the control circuitry, applying compass calibration data to the compass data in response to the operation of the electronic component that produces the magnetic interference, wherein applying the compass calibration data comprises applying the compass calibration data based on the position of the lens with respect to the image pixel array.

2. A method for operating an electronic device having control circuitry, an electronic component comprising a light source that is operated using the control circuitry, and a compass that is operated using the control circuitry, the method comprising:
    operating the electronic component, wherein operating the electronic component produces magnetic interference for the compass;
    obtaining compass data with the compass;
    with the control circuitry, obtaining a power level associated with electrical power that is supplied to the light source; and
    with the control circuitry, applying compass calibration data to the compass data in response to the operation of the electronic component that produces the magnetic interference, wherein applying the compass calibration data comprises applying the compass calibration data based on the power level.

3. The method defined in claim 1 wherein the control circuitry is provided with component-specific calibration data associated with the electronic component and wherein applying the compass calibration data comprises applying the component-specific calibration data to the compass data to calibrate the compass data.

4. The method defined in claim 3 wherein the electronic component has a serial number, wherein the component-specific calibration data is associated with the serial number, and wherein applying the compass calibration data comprises applying the component-specific calibration data that is associated with the serial number to the compass data to calibrate the compass data.

5. The method defined in claim 1 wherein applying the compass calibration data comprises applying the compass calibration data based at least partly on which manufacturer produced the electronic component.

6. A method of using a calibration system to calibrate an electronic device having an electronic component and a compass that generates compass data and that is susceptible to magnetic interference from the electronic component, the method comprising:
operating the electronic component to produce the magnetic interference, wherein the electronic component has a first operational state and a second operational state;
with the calibration system, collecting test data from the compass while operating the component, wherein the test data is influenced by the magnetic interference; and
generating compass calibration data from the test data, wherein the electronic device uses the compass calibration data to adjust the compass data based on the operation of the electronic component that produces the magnetic interference, wherein the compass calibration data comprises compass calibration data specific to the first operational state and compass calibration data specific to the second operational state and wherein the electronic device is configured to apply the compass calibration data specific to the first operational state to the compass data when the electronic component is in the first operational state and is configured to apply the compass calibration data specific to the second operational state to the compass data when the electronic component is in the second operational state.

7. The method defined in claim 6 further comprising:
placing the electronic device in a test chamber to magnetically isolate the electronic device, wherein collecting the test data comprises collecting the test data from the compass while the electronic device is located within the test chamber.

8. The method defined in claim 6 wherein operating the electronic component comprises controlling the electronic component with the calibration system to change the electronic component from the first operational state to the second operational state.

9. The method defined in claim 8 wherein the electronic component comprises a camera having a lens and wherein controlling the electronic component comprises moving the lens.

10. The method defined in claim 8 wherein the electronic component comprises a light source and wherein controlling the electronic component comprises increasing power to the light source.

11. The method defined in claim 6 further comprising:
loading the compass calibration data into the electronic device.

12. The method defined in claim 6 further comprising:
with the calibration system, gathering additional test data for compasses in additional electronic devices;
producing additional compass calibration data from the additional test data for the additional electronic devices; and
loading the compass calibration data and the additional compass calibration data into the electronic device.

13. An electronic device, comprising:
a compass that produces compass data;
an electronic component that generates a magnetic field that interferes with the compass during operation of the electronic component; and
control circuitry that applies compass calibration data to the compass data in response to the operation of the electronic component that generates the magnetic field that interferes with the compass, wherein the control circuitry is configured to obtain operational status information for the electronic component, wherein the electronic component has a first operational state and a second operational state, wherein the compass calibration data comprises compass calibration data specific to the first operational state and compass calibration data specific to the second operational state and wherein the control circuitry is configured to apply the compass calibration data specific to the first operational state to the compass data when the electronic component is in the first operational state and is configured to apply the compass calibration data specific to the second operational state to the compass data when the electronic component is in the second operational state.

14. The electronic device defined in claim 13 wherein the electronic component comprises a camera having a lens, at least one fixed magnet, and a wire coil, wherein an electric current that flows through the wire coil generates the magnetic field, and wherein the control circuitry is configured to change the electric current to move the lens.

15. The electronic device defined in claim 13 wherein the electronic component comprises a light source with an associated power supply line, wherein an electric current that flows through the power supply line generates at least a portion of the magnetic field, and wherein the control circuitry is configured to control the electric current.

16. The electronic device defined in claim 13 wherein the control circuitry is configured to apply the compass calibration data by applying at least one pre-calibrated offset that is specific to the electronic component.

* * * * *